(12) United States Patent
Chee et al.

(10) Patent No.: US 6,324,054 B1
(45) Date of Patent: Nov. 27, 2001

(54) WRAP AROUND SHOCK ABSORBER FOR DISC DRIVES

(75) Inventors: Wai Onn Chee; Joseph Cheng-Tsu Liu; Niroot Jierapipapatanakul; Choon Kiat Lim; Michael Joo-Chiang Toh, all of Singapore (SG); Pow-Hing Yong, Johor Bahru (MY)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/546,674

(22) Filed: Apr. 11, 2000

Related U.S. Application Data (63) Continuation-in-part of application No. 09/236,845, filed on Jan. 25, 1999.
(60) Provisional application No. 60/072,490, filed on Jan. 26, 1998.

(51) Int. Cl.[7] .................................................. H05K 7/00
(52) U.S. Cl. ........................ 361/685; 361/730; 248/635; 360/97.01
(58) Field of Search .................................. 361/685, 683, 361/684, 728, 730; 248/60, 581, 609, 611, 615, 634, 635, 638; 360/97.01, 137

(56) References Cited

U.S. PATENT DOCUMENTS

| | | | |
|---|---|---|---|
| D. 304,178 | 10/1989 | Cranston, III et al. | D14/367 |
| D. 404,723 | 1/1999 | Avery et al. | D14/365 |
| 4,833,554 | 5/1989 | Dalziel et al. | 360/98.04 |
| 5,021,905 | 6/1991 | Sieger | 360/97.02 |
| 5,426,562 | 6/1995 | Morehouse et al. | 361/685 |
| 5,491,608 | * 2/1996 | Koyanagi et al. | 361/685 |
| 5,535,092 | 7/1996 | Bang | 361/685 |
| 5,552,946 | 9/1996 | Bicknese et al. | 360/97.01 |
| 5,583,742 | 12/1996 | Noda et al. | 361/683 |
| 5,587,854 | 12/1996 | Sato et al. | 360/97.01 |
| 5,721,457 | 2/1998 | Sri-jayantha et al. | 307/119 |
| 5,886,714 | * 3/1999 | Bueney et al. | 347/33 |
| 6,005,768 | 12/1999 | Jo | 361/685 |
| 6,078,498 | * 6/2000 | Eckerd et al. | 361/685 |
| 6,097,608 | * 8/2000 | Berberich et al. | 361/752 |
| 6,129,579 | * 10/2000 | Cox et al. | 439/493 |

* cited by examiner

Primary Examiner—Leo P. Picard
Assistant Examiner—Hung Van Duong
(74) Attorney, Agent, or Firm—John R. Wahl; Merchant & Gould LLC (57) ABSTRACT

The shock absorber apparatus for a disc drive is a molded polymeric enclosure adapted to receive and retain a disc drive. One preferred embodiment of the present invention has a shock absorbing material of a first thickness adjacent a critical region of the drive and a second thickness of shock absorbing material adjacent a non-critical region of the disc drive. The first thickness is greater than the second thickness in order to absorb a greater shock load to protect the critical region of the disc drive.

22 Claims, 9 Drawing Sheets

PRIOR ART

WRAP AROUND SHOCK ABSORBER FOR DISC DRIVES

CROSS REFERENCE TO RELATED APPLICATIONS

This application is a continuation-in-part of U.S. patent application Ser. No. 09/236,845, filed Jan. 25, 1999, which claims the benefit of priority of U.S. Provisional Application Serial No. 60/072,490, filed Jan. 26, 1998.

FIELD OF THE INVENTION

This invention relates generally to increasing the shock robustness of disc drives, and in particular embodiments to an apparatus and process for increasing the shock robustness of a disc drive by encapsulating the disc drive in a shock absorbing material.

BACKGROUND OF THE INVENTION

Disc drives are viewed by many as delicate and sensitive data storage devices. External vibrations and shocks can damage a disc drive and destroy large amounts of data. A typical disc drive has one or more circular metal discs, coated on both sides with a thin layer of magnetizable material. These discs can be mounted on a spindle that rotates them at a constant, high speed. For each surface (the top and the bottom of each disc), the drive has a read/write head. These heads are mounted on a head assembly that moves them in toward the spindle or out toward the edge of the disc.

Traditional disc drives are designed to keep the heads flying several microns above the surface of the discs. The air flow created between the heads and surface keeps the heads from touching the surface. If the head hits the surface too hard, the head will damage the surface (and possibly the head). In particular, if the head hits the surface and scraps off a portion of the magnetizable coating, data stored on that portion of the disc may be lost. External vibrations and shock can damage the disc drive by causing the head to hit the disc.

External vibrations and shock may be caused by packaging, transporting, assembling, and handling the disc drive. To reduce these damaging effects, the disc drives have been designed to meet specific, customer defined vibration and shock specifications. Specifically, many disc drives use shock absorbers to reduce the damaging effects of the customer defined specification loads.

Figure 1:
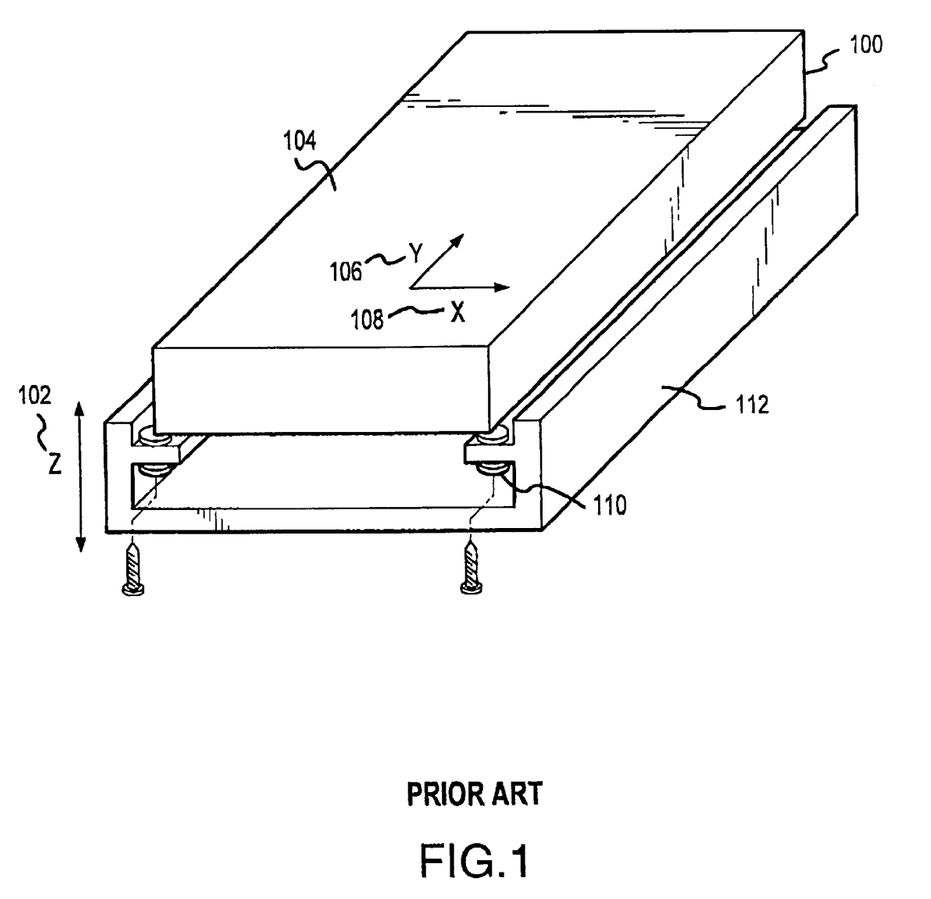
FIG. 1 schematically illustrates a prior art shock mount design.

Conventional shock absorbers may use shock mounts 110 to attach a bracket 112 to the disc drive 100 and isolate the disc drive 100 from vibration and shock, as represented by FIG. 1. The Z axis 102 is defined as the direction perpendicular to the top cover surface 104 of the disc drive 100. The X axis 108 is defined in the direction of the shortest edge and the Y axis 106 is defined in the direction perpendicular to the X axis. This shock mount design tends to protect the disc drive 100 from the customer specified shock. The design also protects the individual components inside the disc drive, such as the spindle/motor, head gimbal assembly, e-block arm to disc spacing, etc. However, the shock mount design is often times limited to only absorbing the customer defined shock load specification.

The shock mount design can be tested by using a shock mount test. In the shock mount test, engineers select a mounting orientation for the disc drive 100. The mounting orientation is related to a customer specified shock direction. The disc drive 100 is mounted on a table in accordance with the selected orientation. The table is then dropped onto a stopper. The stopper imparts a predefined amount of deceleration to the table and hence, to the disc drive 100. Shock mount designs that pass the shock mount test generally protect and isolate the disc drive 100 from the customer defined vibration and shock load specification.

As an alternative to the shock mount design, conventional disc drive systems may also use a shock absorbent jacket to protect the disc drive from vibration and shock. The shock absorbent jacket is made of a shock absorbing material that encloses the disc drive. However, like the shock mount design, the shock absorbent jacket generally protects and isolates the disc drive from the customer defined vibration and shock load specifications.

The shock absorbent jacket is tested using a three axes test. The three axes test comprises providing a perpendicular shock input on all six surfaces of the disc drive. The Z axis is defined as the direction perpendicular to the top cover surface of the disc drive. The top cover surface is the surface with the largest surface area. The X axis is defined in the direction of the longest edge of the disc drive and the Y axis is defined in the direction perpendicular to the X axis. The shock input provided by the three axes test is predictable and controlled. In particular, the disc drive is dropped from a specified height and direction which are proportional to the magnitude and direction of a customer defined shock specification.

The conventional shock absorbers, such as the shock mount design and the shock absorbent jacket, are typically not defined to absorb unpredictable vibrations and shocks. These shock absorbers frequently fail to protect the disc drive system from vibration and shocks produced in harsh environments. Instead, such shock absorbers may only protect the disc drive from the customer defined shock.

Thus, there is a need in the art for a shock absorbing apparatus that is capable of absorbing shocks in harsh and unpredictable environments.

SUMMARY OF THE INVENTION

To overcome the limitations in the prior art described above, as well as other limitations that will become apparent upon reading and understanding the following detailed description, the present invention is an apparatus for increasing the robustness of a disc drive. Generally, the present invention is a drive enclosure that has a shock absorbing material encapsulating a disc drive. The disc drive, for purposes of this description, has at least one critical region and at least one non-critical region. A critical region is a region of the drive that is relatively sensitive to vibration and shock accelerations. A non-critical region of the drive is a region that is relatively insensitive to vibration and shock accelerations. The shock absorbing material has a first portion of a first thickness and a second portion of a second thickness. The first thickness is adapted to cover each critical region of the disc drive. The second thickness is adapted to cover each non-critical region of the disc drive. The first thickness is greater than the second thickness.

BRIEF DESCRIPTION OF THE DRAWINGS

The various sheets of drawing include reference numbers in which like reference numbers represent corresponding parts throughout the various figures.

DETAILED DESCRIPTION OF THE INVENTION

In the following description of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

Figure 2:
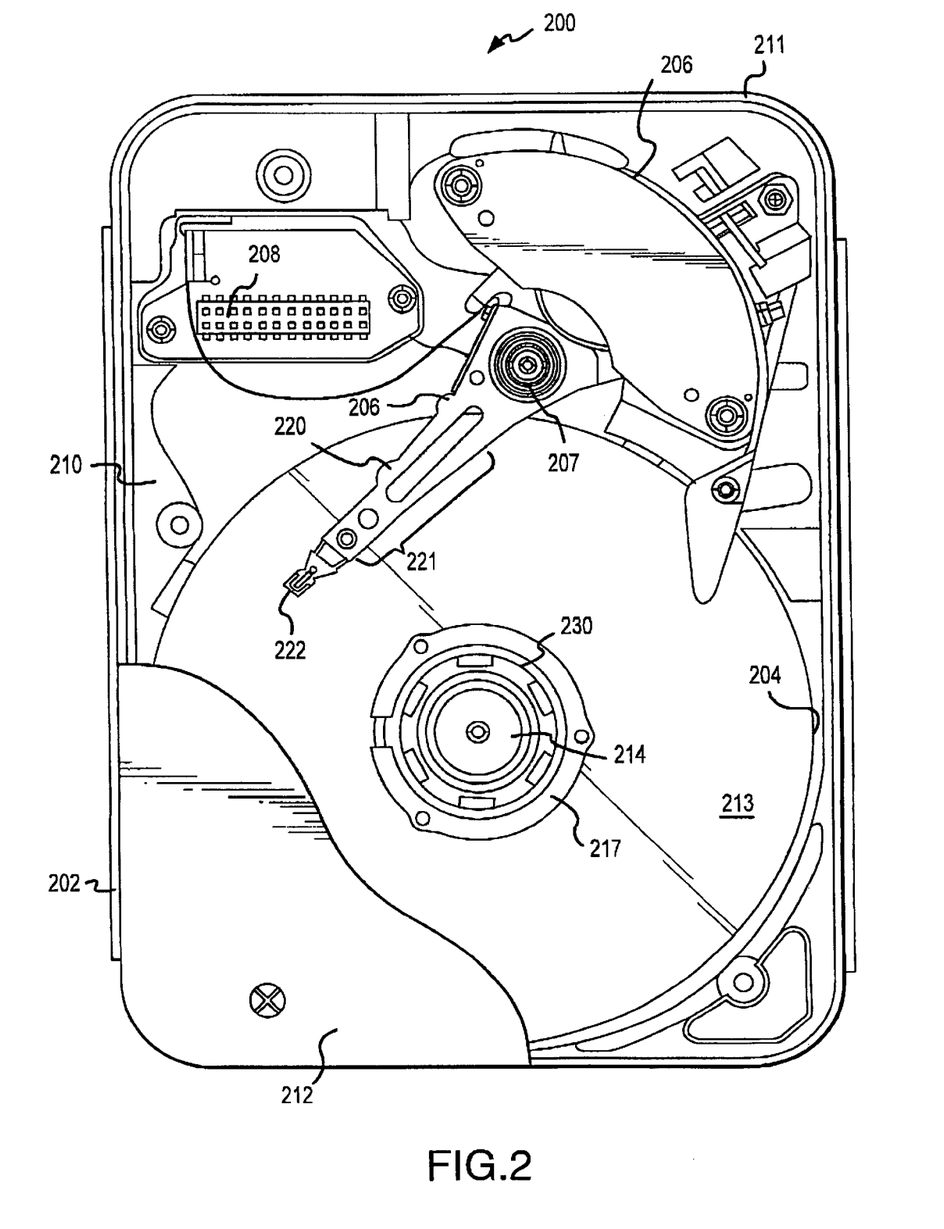
FIG. 2 is a plan view of an exemplary disc drive with its cover partially broken away to show typical internal components.

FIG. 2 illustrates a typical disc drive apparatus that could be used in the system including embodiments of the present invention. The disc drive apparatus 200 includes a housing 202 (partially shown), a data storage disc 204, head-arm assembly 206 which resides adjacent the data storage disc 204 and a controller 208 (partially shown). FIG. 2 is a top plan view of the disc drive apparatus 200, wherein a top portion of the apparatus 200 has been cut-away to expose the head-arm assembly 206 positioned over the data storage disc 204. It will be understood that numerous details of construction of the disc drive 200 are not included in the following description, as such, they are well known to those skilled in the art and are believed to be unnecessary for the purpose of describing the present invention.

The housing 202 includes a base 210 and a top 212, wherein the base 210 is configured to support the data storage disc 204 and the head-arm assembly 206. The top 212, coupled with the base 210 and a perimeter gasket 211, provide a sealed internal environment for the disc drive 200.

The data storage disc 204 includes a recording surface 213 which is divided into concentric circular data tracks (not shown). Alternatively, the recording surface 213 may define a spiral track configuration. The recording surface 213 is capable of receiving and storing information for later use.

A spindle motor 214, encased by a hub 230, is mounted to the base 210. The data storage discs 204, which are centered open discs, are mounted around the hub 230 and secured by a clamp ring 217 for rotation at a constant half speed. Typically, the motor 214 is capable of spinning between 7200 to at least 20,000 rpm.

Adjacent the disc 204 is a head-arm assembly 206 which pivots on a pivot spindle assembly 207. The head-arm assembly 206 includes an arm 220, a suspension member 221 and a read/write head 222, wherein the head 222 is positioned over the data storage disc 204 at one end of the suspension member 221. The suspension member 221 can be moved across the recording surface 213 of the disc 204, thereby allowing the head 222 to be moved across the face 213 such that the information on the disc 204 can be read. If an external vibration or shock occurs, or if an intense internal vibration occurs, while the heads 222 is being moved to a particular destination, the head 222 may not be capable of reading the information on the disc. As a result, an error may occur during a reading or writing operation due to that vibration.

A plurality of storage discs 204 may be arranged in a stack, supported on the motor 214. A plurality of heads are supported on a head-arm assembly 206 in an E-block structure, to access the discs 204 simultaneously, wherein each head accesses one of two surfaces (top and bottom) of each disc 204.

The movement of the head-arm assembly 206 is controlled by the controller 208. The controller 208 is coupled to the base 210 and is in electronic communication with further components of the disc drive apparatus 200. The controller 208 comprises any suitable means capable of controlling the components of the disc drive, such as, the motor 214 and the head-arm assembly 206.

Those skilled in the art will recognize that the exemplary environment illustrated in FIG. 2 is not intended to limit the present invention. Indeed, those skilled in the art will recognize that other alternative disc drive designs may be used without departing from preferred embodiment of the present invention.

Figure 3:
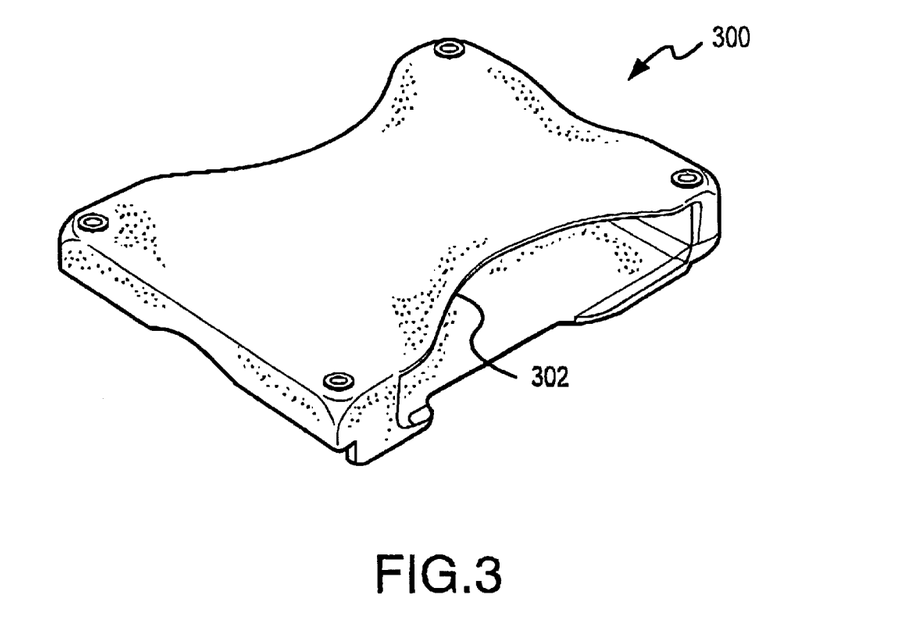
FIG. 3 is a perspective view of a shock absorber apparatus for enclosing or encapsulating a disc drive according to one preferred embodiment of the present invention.

One preferred embodiment of the present invention provides a shock absorbing material 300 for encapsulating a disc drive 200, as illustrated in FIG. 3. The shock absorbing material 300 has openings 302 for inserting the disc drive 200. A typical disc drive 200 has critical regions 304, such as corners, and non-critical regions 306, such as the top surface. The critical regions 304 are more susceptible to being damaged by external vibrations or shocks. At the critical regions 304, the shock absorbing material 300 is thicker than the shock absorbing material 300 at the non-critical regions 306, similar to a bumper in a typical automobile.

The thickness of the shock absorbing material 300 is related to the material's shock absorbing capability. In the preferred embodiment of the invention, the thickness of the material may range from 30 to 500 mils. The thickness is limited by the location of the disc drive in a computer and physical space constraints. The thickness is also related to whether a critical region 304 of the disc drive is being protected.

The shock absorbing material 300 may be made of natural or synthetic rubber (or its compounds) or plastic. Possible rubber candidates are: high damping butyl, impregnated rubber (e.g., Silicone), a thermoplastic elastomer, dispensable e.g., Polyurethane), etc. Possible plastic candidates are: acrylonitrile-butadiene-styrene copolymer, polypropylene, polyethylene, etc. Other plastic alternatives may also be used.

Unlike many conventional shock absorbers, the shock absorbing material 300 is designed to isolate a disc drive from unpredictable vibrations and shocks. In particular, the shock absorbing material 300 is designed to pass rigorous shock testing methods, such as the tilt drop test and the table top test. These shock testing methods assist in producing a shock absorbing material 300 that can protect disc drives in unstable environments, such as automobiles and household appliances.

Figure 4:
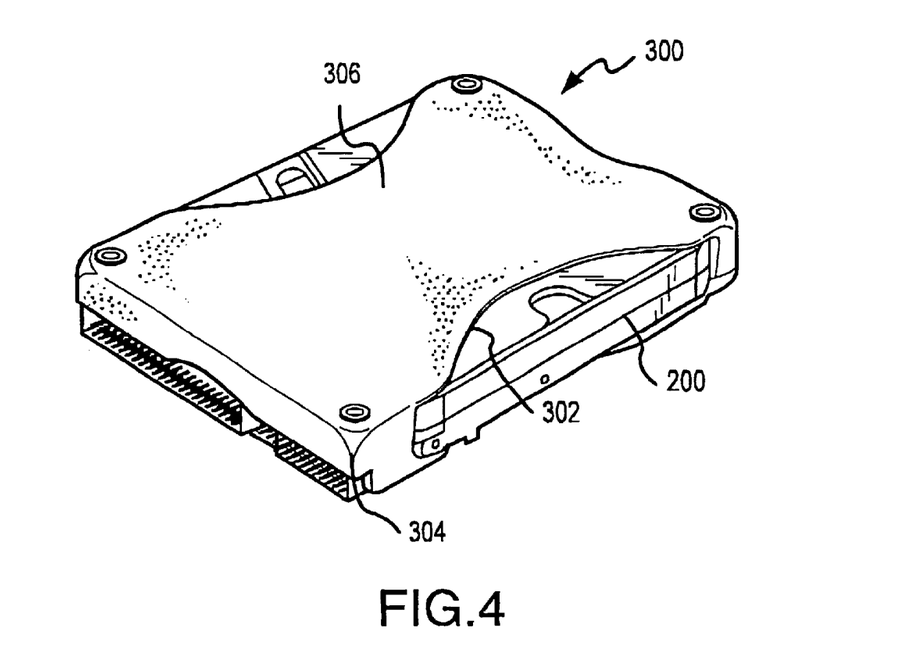
FIG. 4 is a perspective view of a disc drive system including a shock absorber apparatus shown in FIG. 3.
Figure 5:
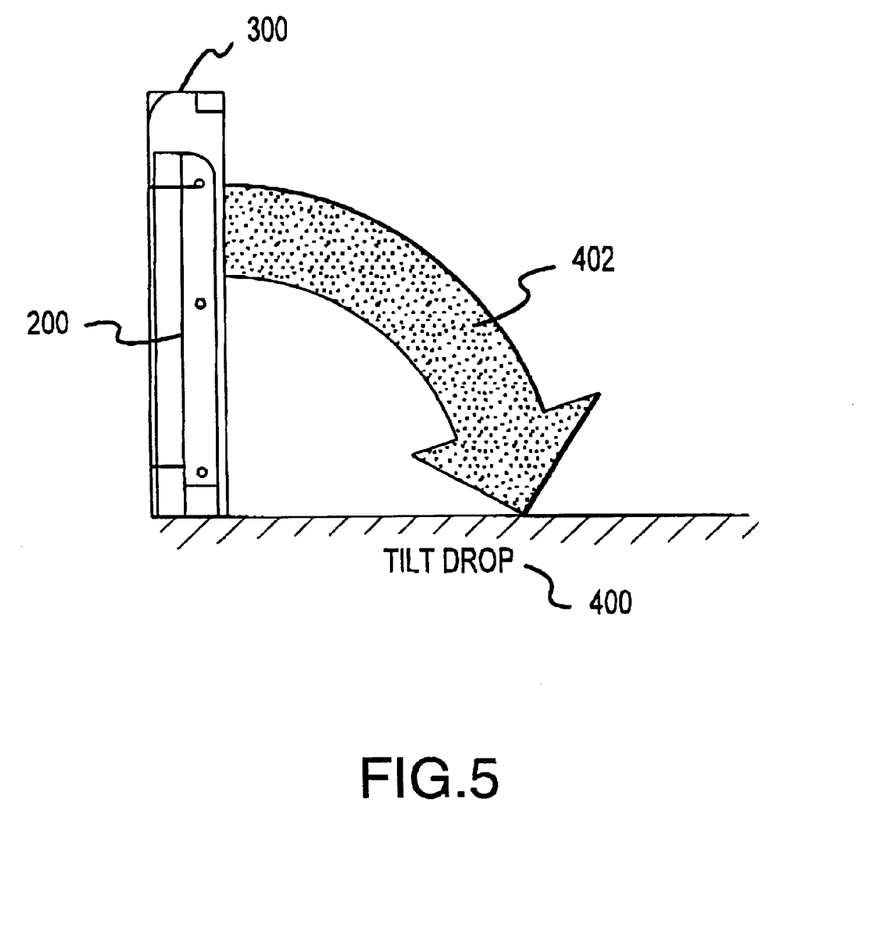
FIG. 5 schematically illustrates an exemplary tilt drop test configuration for the system in FIG. 4.

FIG. 4 displays the tilt drop test. In the tilt drop test, the disc drive 200, which is encapsulated in the shock absorbing material 300, is initially positioned in a vertical position, on a surface above the floor. The disc drive 200 is allowed to freely fall onto a tilt drop 400, using one edge as a pivot. The arrow 402 represents the path the disc drive 200 follows. The tilt drop test is only fairly consistent because each incident of the test can produce varying results. In particular, the results vary with the surface condition and the handling of the disc drive.

The table drop test involves pushing the disc drive 200, which is encapsulated in the shock absorbing material 300, gradually off the edge of a typical working table. The disc drive 200 is allowed to freely fall and impact the floor. The table test may involve an entire computer with the disc drive 200 mounted inside the computer in a casing. Both the tilt drop test and table drop test are used to simulate external vibrations produced in harsh environments. Conventional shock absorbers, which were designed using the three axes test or the shock mount test, frequently fail both the tilt drop test and the table drop test. In particular, the conventional shock absorbers fail to isolate the disc drive from unpredictable vibration and shocks.

Figure 6:
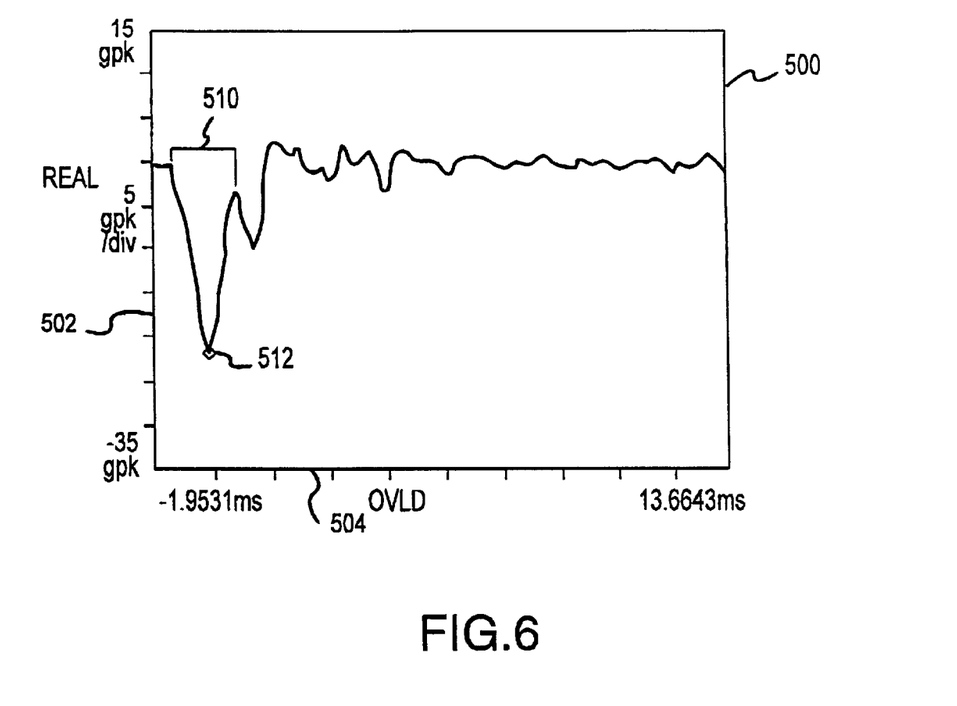
FIG. 6 illustrates shock signals received from an accelerometer attached to a disc drive that is encapsulated by a shock absorber material shown in FIG. 4 in accordance with the present invention.
Figure 7:
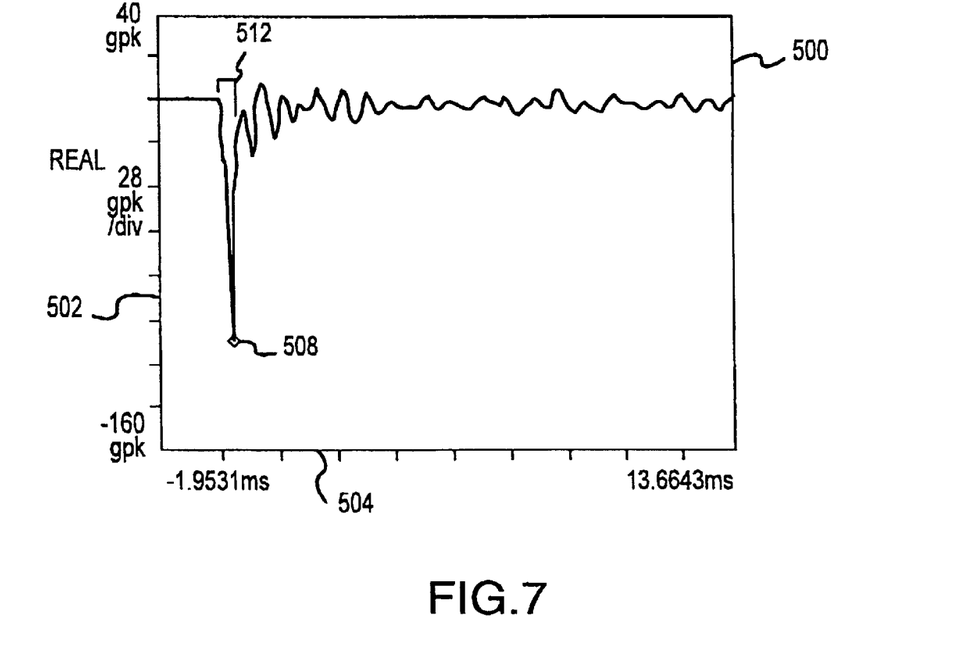
FIG. 7 illustrates shock signals received from an accelerometer attached to a conventional disc drive that is not encapsulated by a shock absorber.

FIGS. 6 and 7 shows the performance of the shock absorbing material 300 in an exemplary tilt drop test. In particular, FIGS. 6 and 7 show the shock pulse registered by an accelerometer mounted on a drive with the shock absorbing material 300 and without the shock absorbing material 300. The drive is subjected to a 90 degree tilt drop test. The vertical axis 502 of the graph 500 is the shock amplitude measured in Gs. The horizontal axis 504 of the graph 500 is the time measured in seconds.

FIG. 6 shows that the drive with the shock absorbing material 300 has a shock pulse that peaks at 21.914 Gs 506. FIG. 7 shows that the drive without the shock absorbing material 300 has a shock pulse that peaks at 109.8 Gs 508. As observed, the shock absorbing material 300 has the potential of reducing an unpredictable input shock by up to 80% (21.914 Gs 506 vs. 109.8 Gs 508). Furthermore, the shock pulse produced using the shock absorbing material 300 is wider than the shock pulse produced without the use of the shock absorbing material (572 microseconds 510 vs. 183 microseconds 512). As the shock impulse widens, the frequency content is reduced. A reduced frequency content represents a lower probability that stiff structures (e.g., the actuator 216) will be affected during a vibration.

Figure 8:
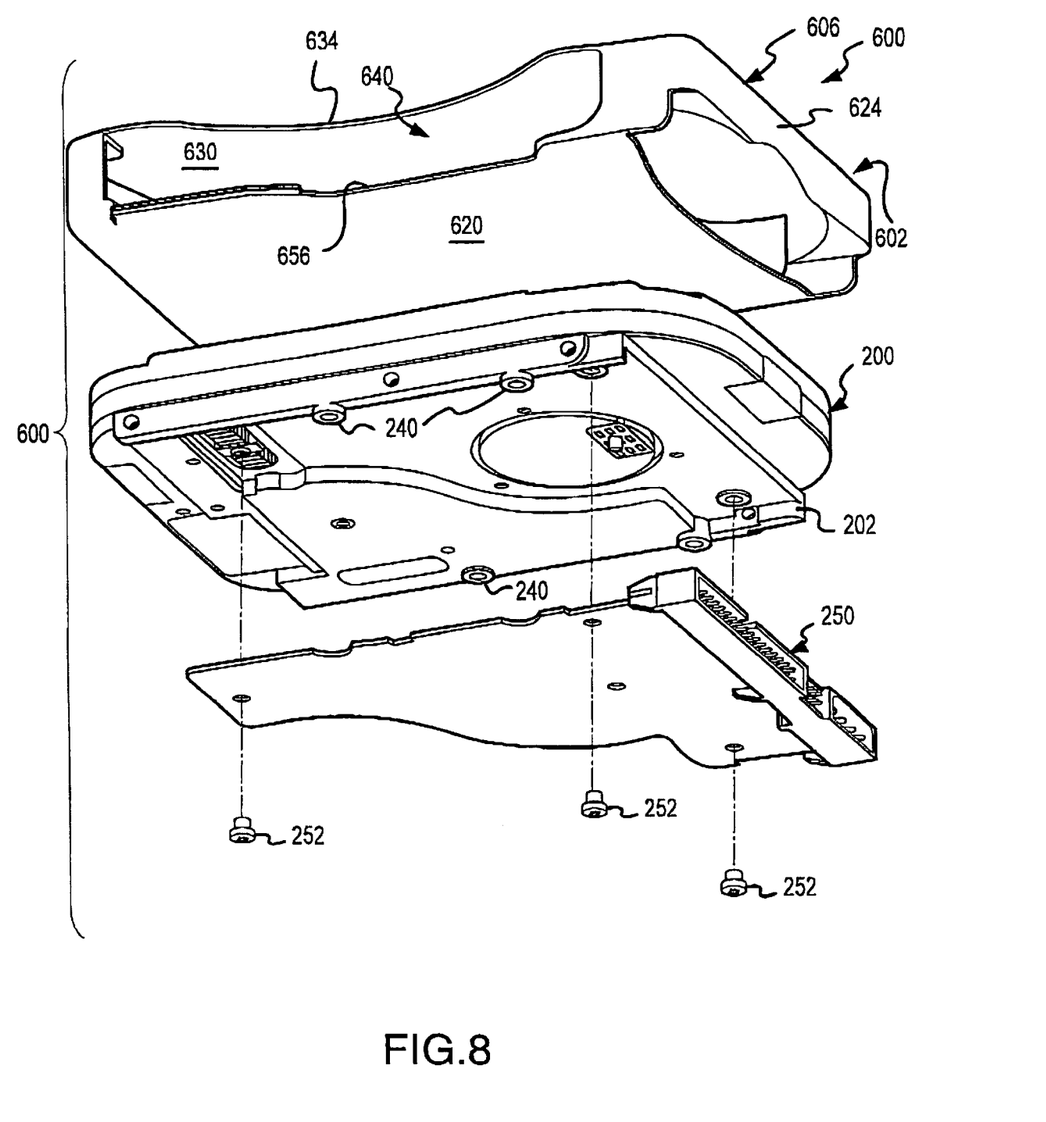
FIG. 8 is an exploded view of a disc drive system in accordance with an alternative preferred embodiment of the present invention.
Figure 9:
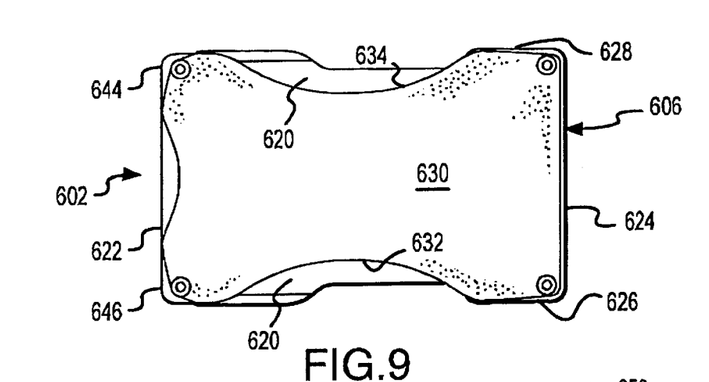
FIG. 9 is a separate top plan view of the shock absorber apparatus for the disc drive system shown in FIG. 8.

FIGS. 8 through 13 illustrate an alternative preferred embodiment of the shock absorber apparatus in accordance with the present invention. An exploded perspective view of a disc drive system 600 is shown in FIG. 8 which includes a shock absorber apparatus 602 for carrying, i.e. enclosing or encapsulating, a disc drive 200. The disc drive 200 includes a servo controller printed circuit board 604 fastened to the bottom of the drive baseplate 606. The assembled disc drive 200 is carried in the shock absorber apparatus 602 in the same manner as in the first embodiment discussed above. The assembled system 600 is shown in perspective views in FIGS. 14 and 15.

The shock absorber apparatus 602 is basically a one piece molded polymeric structure having a box shaped molded body 606 with a central cavity 608 sized to stretch to elastically receive and hold the disc drive 200. The body 606, as viewed from the top in FIG. 9, has a generally rectangular bottom portion 620, a left end all 622, a right end wall 624, and opposing side walls 626 and 628, and top wall portion 630. The top wall portion 630 is a generally flat rectangular plate portion having a pair of arcuate cutout edges 632 and 634 adjacent and spaced from the side walls 626 and 628 respectively. These cutout edges 632 and 634 provide space to accommodate the drive mounting bosses 240 on the underside of the side rails of the disc drive base 202.

Figure 12:
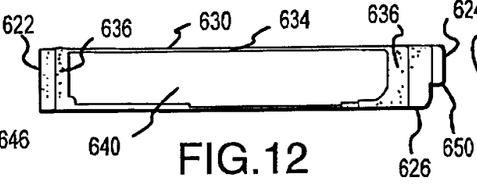
FIG. 12 is a side view of the shock absorber apparatus shown in FIG. 8.

Referring now to the typical side view of FIG. 12, each of the side walls 626 and 628 has a left end portion 636 and a right end portion 638 defining an elongated aperture 640 therebetween bounded on top by one of cutout edges 632 and 634 and on the bottom by bottom portion 620.

Figure 11:
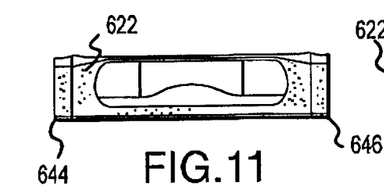
FIG. 11 is a left end view of the shock absorber apparatus as shown in FIG. 9.

A left end view of the body 606 is shown in FIG. 11. The left end wall 622 is a solid wall having an elongated elliptical aperture 642 therethrough. The left end of the end wall 622, as viewed in FIG. 11, joins with the side wall 628 at a thickened corner portion 644. The right end of the end wall 622, as viewed in FIG. 11, joins with the side wall 626 in a thickened corner portion 646.

Figure 13:
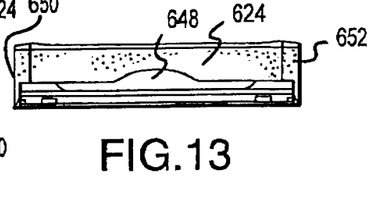
FIG. 13 is a right end view of the shock absorber apparatus shown in FIG. 9.

Similarly, a right end view of the body 606 is shown in FIG. 13. The right end wall 624 is a solid wall with a cutout formed at the juncture of the bottom portion 620 with the end wall 624 such that there is an aperture 648 extending the full length of the end wall 624. The left end of the end wall 624, as viewed in FIG. 13, joins with the side wall 626 at a thickened corner portion 650. The right end of the end wall 624, as viewed in FIG. 13, joins with the side wall 628 in a thickened corner portion 652. These corner portions 646, 648, 650 and 652 are thicker than the side walls and the top and bottom portions so as to absorb larger shock loads, since most shock loadings that occur during transport and handling of the system are focused on the corner portions of the body 606. These are the typical critical regions in a disc drive such as drive 200. The thin portions of the end walls 622 and 624, and the thin portions of the side walls 626 and 628, along with the top portion 630 and bottom portion 620, are substantially thinner than the corner portions, as these side, end, top and bottom portions experience less shock loading during unpredictable events such as table drops and corner drops and other handling mishaps and are thus non-critical regions. In addition, the design of the one piece enclosure molding 606 with thickened corner portions cradles the drive so as to predictably distribute shock loads in such a manner as to minimize the affect on the drive itself.

Figure 14:
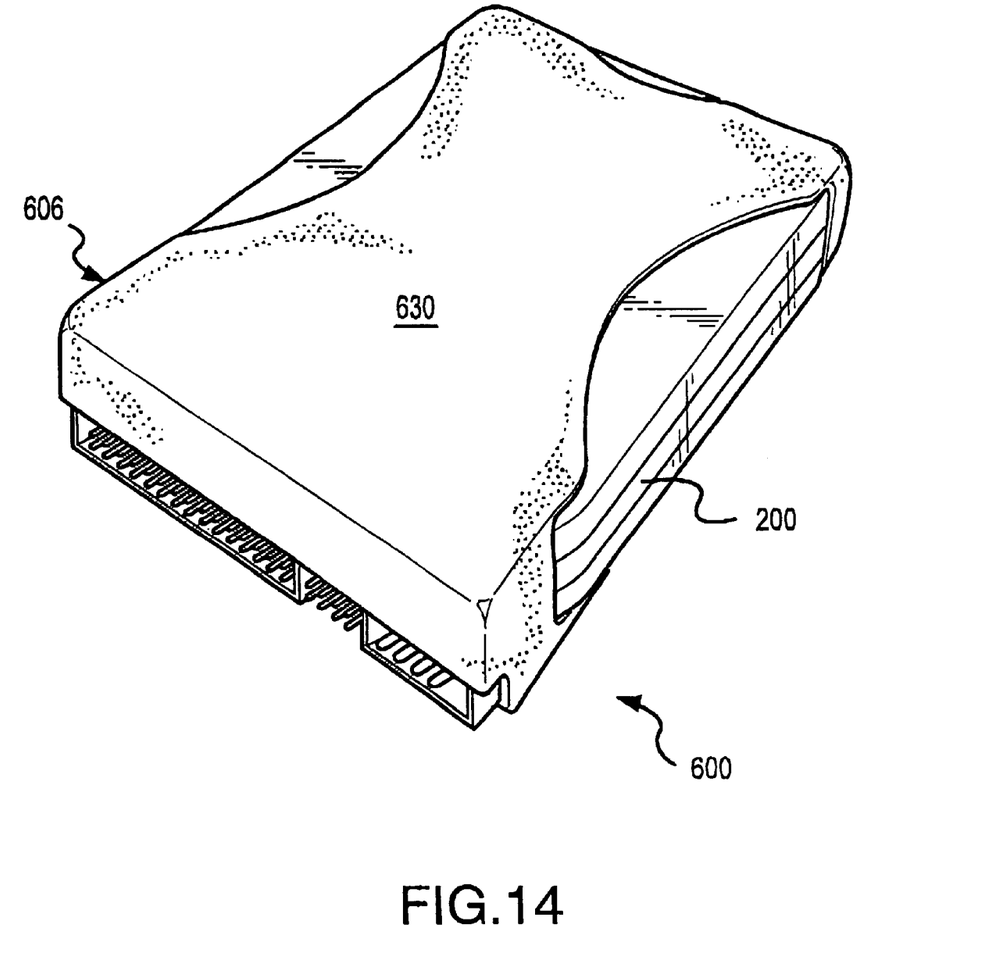
FIG. 14 is a perspective upper view of the system in accordance with the alternative preferred embodiment of the invention in FIG. 8.
Figure 15:
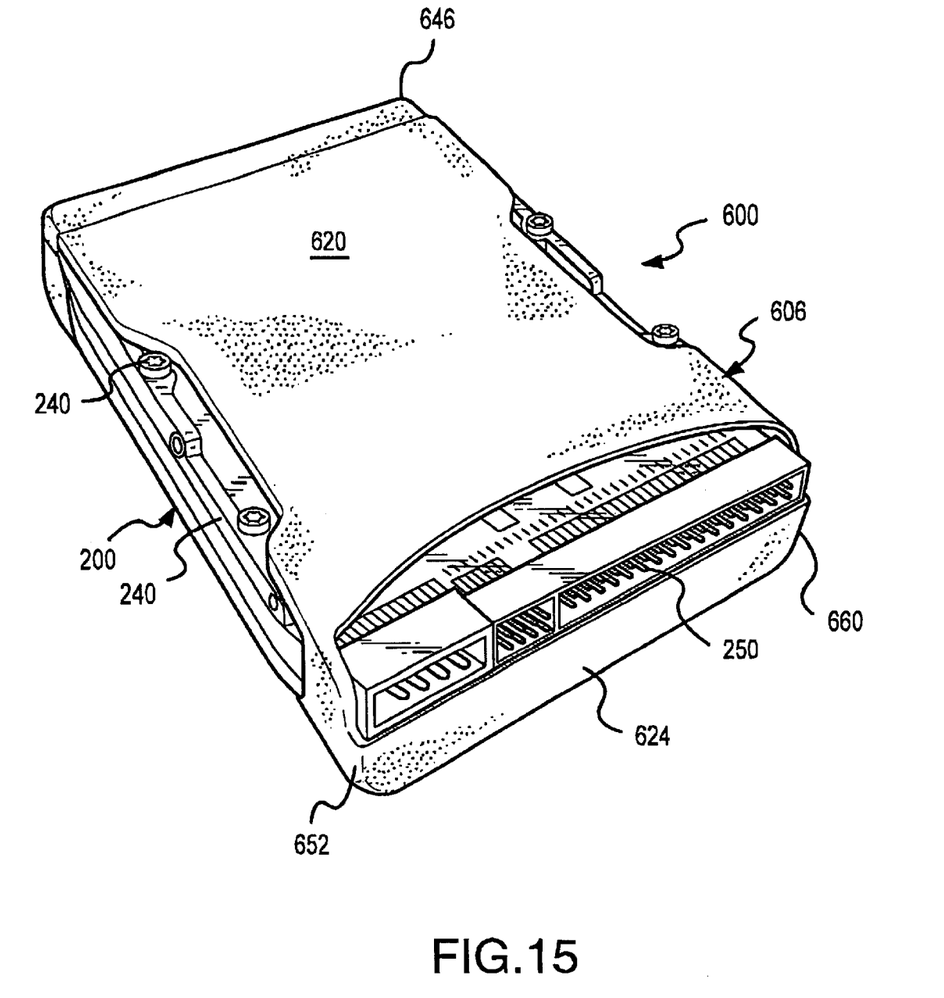
FIG. 15 is a perspective lower view of the system in accordance with the alternative preferred embodiment of the invention in FIG. 8.

As is shown in FIG. 8 and in the assembled system shown in FIGS. 14 and 15, the disc drive 200 has a printed circuit board/ external connector assembly 250 fastened to the underside of the drive 200 via screws 252. The assembled disc drive 200 is then slipped through one of the side opening 640 and turned to properly position the drive 200 in the body 606 with the connector assembly 250 projecting through the aperture 648 in the right end wall 624.

Figure 10:
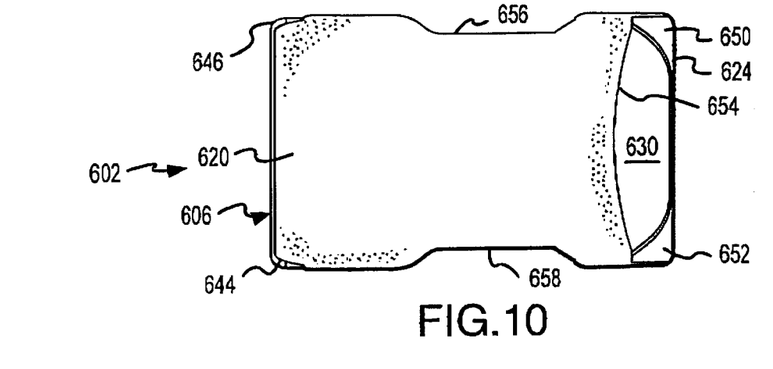
FIG. 10 is a separate bottom plan view of the shock absorber apparatus shown in FIG. 8.

Referring now to FIG. 10, a bottom view of the body 606 is shown. The bottom portion 620 has a cutout end edge 654 which is positioned to reside behind the connector assembly 250. The bottom portion 620 also has a pair of recessed side edge portions 656 and 658 which permit mounting bosses 240 to project slightly beyond the bottom portion 620 while providing full cushioning for almost the entire bottom of the drive 200. The inside edges of the thickened corner portions 644 and 646 are indicated in this figure by the curved dashed lines.

A perspective upper view of the assembled system 600 of a disc drive 200 in the shock absorber enclosure 602 is shown in FIG. 14. A perspective bottom view of the assembled system 600 is shown in FIG. 15. As can readily be seen, all of the corners are protected with the exception of the connector lower corners which necessarily must protrude from the enclosure 602.

Referring back now to FIG. 9, the top portion 630 also has four shallow protrusions 660 of the body 606 which have concave central recesses forming support feet for the system 600 when the system 600 rests on a flat surface rather than being installed in a rack configuration. These protrusions and recesses cooperate to stabilize the body 606 on a flat surface and provide some additional shock absorbing capability if the system is dropped against its upper side.

The enclosure body 606 is preferably molded of an elastomeric material with high damping characteristics such as ethylene propylene dimer (EPDM), and may optimally have a Hardness Shore A of between about 40 to 50. For a typical 3 ½ inch form factor drive 200, the thickness of the top and bottom portions may be between 0.003 and 0.013 inches while the end and corner portions may range from about 0.15 inch to 0.5 inch in thickness depending on the curvature and boundary conditions of the drive compared to the form factor outer dimensions. Thus it can readily be seen that the critical regions of the drive are covered by a thickened portion of the shock absorber body 606.

In summary, the apparatus and system of a wrap around shock absorber for disc drives includes a shock absorbing material (such as 300) formed so as to encapsulate a disc drive 200. The disc drive 200 has at least one critical region 304 and one non-critical region 306. The shock absorbing material 300 has a first portion of a first thickness and a second portion of a second thickness. The first thickness is adapted to cover each critical region 304 of the disc drive 200. The second thickness is adapted to cover each non-critical region 306 of the disc drive 200. The first thickness is greater than the second thickness.

The system includes a disc drive 200 and a shock absorbing material 300 for encapsulating the disc drive 200. The disc drive 200 has at least one critical region 304 and one non-critical region 306. The shock absorbing material 300 has a first portion of a first thickness and a second portion of a second thickness. The first thickness is adapted to cover each critical region 304 of the disc drive 200. The second thickness is adapted to cover each non-critical region 306 of the disc drive 200. The first thickness is greater than the second thickness.

Stated another way, the apparatus and system of the present invention may be viewed as a shock absorber apparatus (such as 300 or 602) for encapsulating a disc drive (such as 200), wherein the disc drive (such as 200) has at least one critical region and at least one non-critical region. The shock absorbing apparatus is an enclosure (such as 606) sized to receive a disc drive therein, the enclosure (such as 606) being made of a shock absorbing material having a first portion (such as 644, 646, 650 or 652) having a first thickness adapted to cover a critical region of the disc drive, and a second portion (such as 620 and 630) having a second thickness adapted to cover a non-critical region of the disc drive, wherein the first portion has a greater thickness than the thickness of the second portion. The critical region typically includes a corner of the disc drive and the first thickness is preferably greater than 30 mils and less than 500 mils. The shock absorbing material (such as 300 or 606) may include a polymeric material selected from a group consisting essentially of natural rubber, synthetic rubber, and plastic and preferably has an aperture (such as 640 or 648) sized to stretch for passing the disc drive into the enclosure (such as 606 or 300).

Stated another way, the present invention may be viewed as a disc drive system (such as 600) which includes a disc drive (such as 200) and a shock absorber enclosure (such as 606 or 300) enclosing the disc drive (such as 200). The shock absorber (such as 606) has first portions (such as 644, 646, 650, and 652) of a shock absorbing material having a first thickness adapted to cover each critical region (such as the corners) of the disc drive (such as 200), and second portions (such as 620 and 630) of the shock absorbing material having a second thickness adapted to cover each non-critical region (such as the top and sides) of the disc drive, wherein the first portions have a greater thickness than the second portions. The disc drive (such as 200) has at least one critical region which preferably includes a corner of the disc drive and the first thickness is preferably greater than mils and less than 500 mils. The shock absorber (such as 606 or 300) preferably is made of material selected from a group consisting essentially of natural rubber, synthetic rubber, and plastic.

Stated another way, the invention may be viewed as a shock absorber apparatus (such as 300 or 602) for encapsulating a disc drive (such as 200), wherein the shock absorbing apparatus includes a one piece molded polymeric generally box shaped enclosure (such as 606) sized to elastically receive and retain a disc drive therein (such as 200). The enclosure (such as 300 or 606) is preferably made of a shock absorbing material having a first portion (such as 644, 646, 650, or 652) having a first thickness adapted to cover a critical region such as a corner of the disc drive, and a second portion (such as 620 or 630) having a second thickness adapted to cover a non-critical region of the disc drive such as the top and bottom of the drive, wherein the first portion has a greater thickness than the thickness of the second portion. The enclosure (such as 606) preferably has a top portion (such as 630), a bottom portion (such as 620), a pair of opposite side walls (such as 626 and 628) and left and right end walls (such as 622 and 624), and thickened corner portions (such as 644, 646, 650, and 652) between the side walls and end walls. These side walls and end walls each has an aperture (such as 640 or 648) for passage of the drive into the enclosure or for access to electrical connectors (such as 250) or for mounting bosses (such as 240). The molded enclosure is preferably made of EPDM rubber.

This concludes the description of the preferred embodiments of the invention. The present specification discloses preferred embodiments of an apparatus and process for increasing the shock robustness of disc drives by encapsulating the disc drive in a shock absorbing material. The foregoing description of the preferred embodiments of the invention have been presented for the purposes of illustration and description. It is not intended to be exhaustive or to limit the invention to the precise forms disclosed above. Many modifications and variations are possible in light of the above teaching. For example, other form factors and shapes of disc drives may be accommodated by the shock absorber apparatus of the present invention. In these instances, the location of critical regions and non-critical regions may vary and therefore the location of thickened portions may change accordingly. It is thus intended that the scope of the invention be limited not by this detailed description, but rather by the claims appended hereto.

What is claimed is:

1. A shock absorber apparatus for encapsulating a disc drive, wherein the disc drive has at least one critical region and at least one non-critical region, the shock absorbing apparatus comprising:

an enclosure sized to receive a disc drive therein, the enclosure being made of a shock absorbing material having a first portion having a first thickness adapted to contact and cover a critical region of the disc drive, and a second portion having a second thickness adapted to contact and cover a non-critical region of the disc drive, wherein the first portion has a greater thickness than the thickness of the second portion.

2. The shock absorber apparatus of claim 1 wherein the disc drive has a critical region that comprises a corner of the disc drive.

3. The shock absorber apparatus of claim 1 wherein the first thickness is greater than 30 mils and less than 500 mils.

4. The shock absorber apparatus of claim 1 wherein the shock absorbing material comprises a polymeric material selected from a group consisting of natural rubber, synthetic rubber, and plastic.

5. The shock absorber apparatus of claim 1 wherein the enclosure includes an aperture adapted for passing the disc drive therethrough into the enclosure.

6. A disc drive system comprising:

a disc drive;

a shock absorber enclosure enclosing the disc drive having first portions of a shock absorbing material having a first thickness adapted to contact and cover each critical region of the disc drive, and second portions of the shock absorbing material having a second thickness adapted to contact and cover each non-critical region of the disc drive, wherein the first portions have a greater thickness than the second portions.

7. The disc drive system of claim 6 wherein at least one critical region comprises a corner of the disc drive.

8. The disc drive system of claim 6 wherein the first thickness is greater than 30 mils and less than 500 mils.

9. The disc drive system of claim 6 wherein the shock absorber comprises material selected from a group consisting essentially of natural rubber, synthetic rubber, and plastic.

10. A shock absorber apparatus for encapsulating a disc drive, wherein the disc drive has at least one critical region and at least one non-critical region, the shock absorbing apparatus comprising:

a one piece molded polymeric generally box shaped enclosure sized to elastically receive and retain a disc drive therein, the enclosure being made of a shock absorbing material having a first portion having a first thickness adapted to contact and cover a critical region of the disc drive, and a second portion having a second thickness adapted to contact and cover a non-critical region of the disc drive, wherein the first portion has a greater thickness than the thickness of the second portion.

11. The apparatus according to claim 10 wherein the enclosure has a top portion, a bottom portion, a pair of opposite side walls and left and right end walls, and thickened corner portions between the side walls and end walls.

12. The apparatus according to claim 10 wherein the molded enclosure is made of EPDM rubber.

13. The apparatus according to claim 11 wherein the side walls and end walls each has an aperture therethrough.

14. A disk drive system comprising:

a disk drive; and a shock absorbing means comprising a one piece molded polymeric structure having a box shaped molded body with a central cavity sized to elastically receive and hold the disc drive, enclosing a substantial portion of the disc drive.

15. A shock absorbing covering for encapsulating a disc drive, wherein the disc drive has a plurality of critical regions and a plurality of non-critical regions, the shock absorbing covering comprising:

an enclosure sized to receive a disc drive therein, the enclosure being made entirely of a flexible shock absorbing material, the enclosure including a plurality of first portions having a first thickness, each of the first portions covering and contacting a corresponding one of the plurality of critical regions, and a plurality of second portions each having a second thickness, each of the second portions covering and contacting a corresponding one of the plurality of non-critical regions, wherein the first portion has a greater thickness than the thickness of the second portion.

16. The shock absorbing covering of claim 15 wherein the first thickness is greater than 30 mils and less than 500 mils.

17. The shock absorbing covering of claim 15 wherein the flexible shock absorbing material comprises a material selected from a group consisting of natural rubber, synthetic rubber, and plastic.

18. The shock absorber covering of claim 15 wherein the covering includes an aperture adapted for passing the disc drive therethrough into the enclosure.

19. A disc drive system comprising:

a disc drive having a plurality of critical regions and a plurality of non-critical regions;

an enclosure sized to receive a disc drive therein, the enclosure being made entirely of a flexible shock absorbing material, the enclosure including a plurality of first portions having a first thickness, each of the first portions covering and contacting a corresponding one of the plurality of critical regions, and a plurality of second portions each having a second thickness, each of the second portions covering and contacting a corresponding one of the plurality of non-critical regions, wherein the first portion has a greater thickness than the thickness of the second portion.

20. The disc drive system of claim 19 wherein the disc drive includes at least one corner and wherein at least one of the critical regions comprises the at least one corner of the disc drive.

21. The disc drive system of claim 19 wherein the first thickness is greater than 30 mils and less than 500 mils.

22. The disc drive system of claim 19 wherein the flexible shock absorbing material comprises material selected from a group consisting essentially of natural rubber, synthetic rubber, and plastic.

* * * * *

UNITED STATES PATENT AND TRADEMARK OFFICE
CERTIFICATE OF CORRECTION

PATENT NO. : 6,324,054 B1
DATED : November 27, 2001
INVENTOR(S) : Wai Onn Chee et al.

It is certified that error appears in the above-identified patent and that said Letters Patent is hereby corrected as shown below:

<u>Title page,</u>
Item [75], 3$^{rd}$ inventor, delete "Jierapipapatanakul" and replace with
-- Jierapipatanakul --.

Signed and Sealed this

Fourteenth Day of May, 2002

*Attest:*

JAMES E. ROGAN
*Attesting Officer*   *Director of the United States Patent and Trademark Office*